June 26, 1962    H. S. KITTREDGE ET AL    3,040,630
MACHINE AND METHOD FOR REMOVING RIND FROM MOLDED OBJECTS
Filed Nov. 27, 1957    6 Sheets-Sheet 3
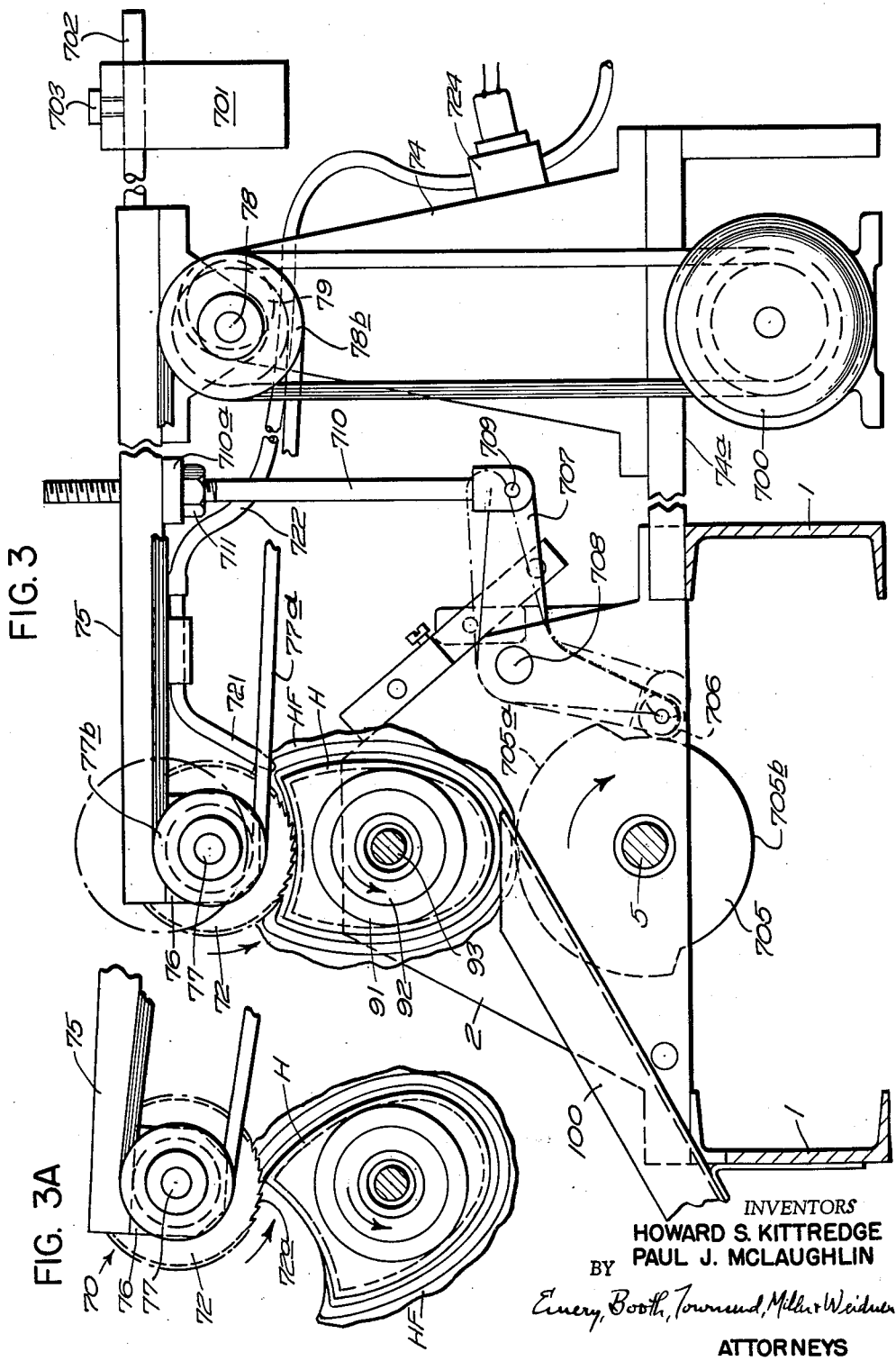
INVENTORS
HOWARD S. KITTREDGE
PAUL J. MCLAUGHLIN
BY
Emery, Booth, Townsend, Miller & Weidner
ATTORNEYS

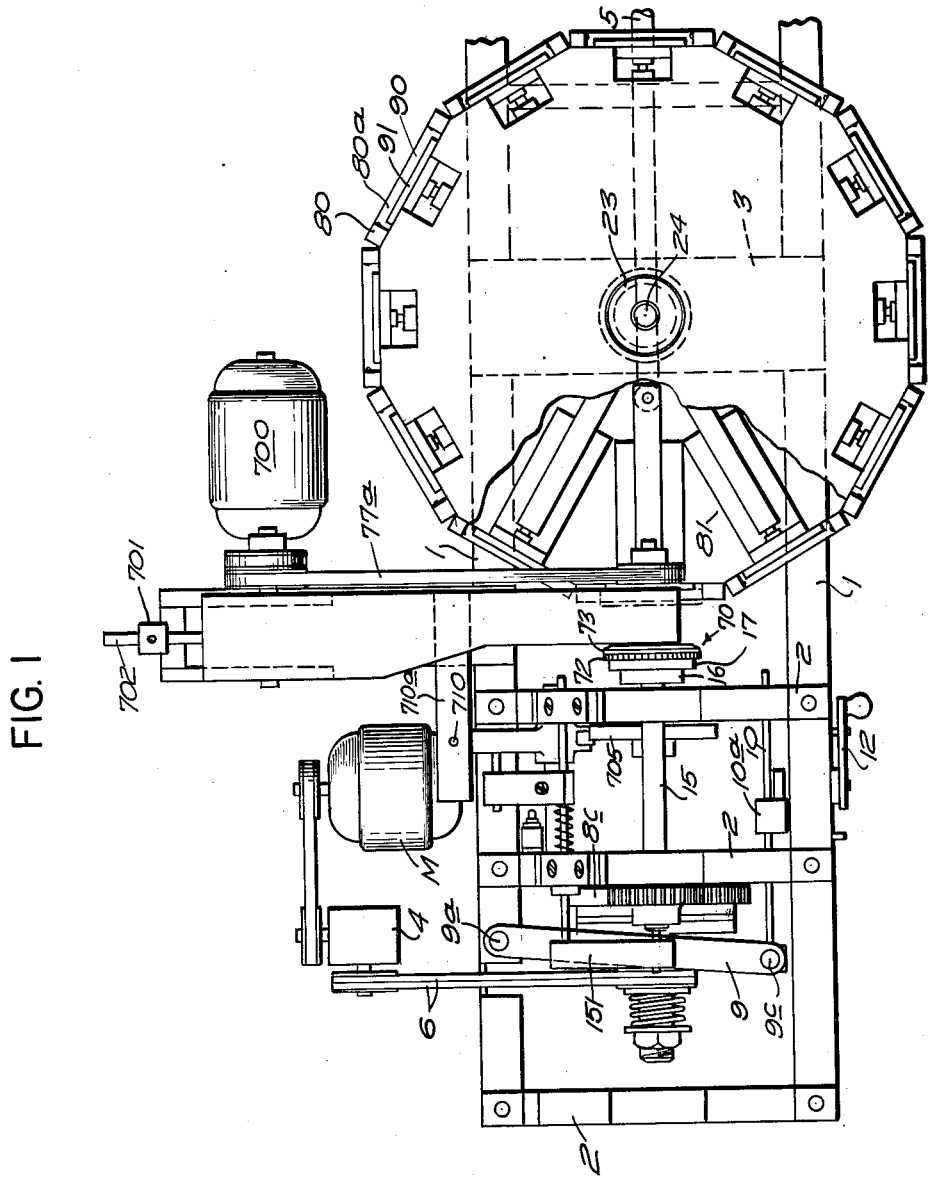
FIG. I
INVENTORS
HOWARD S. KITTREDGE
PAUL J. MCLAUGHLIN
BY
Emery, Booth, Townsend, Miller & Weidner
ATTORNEYS

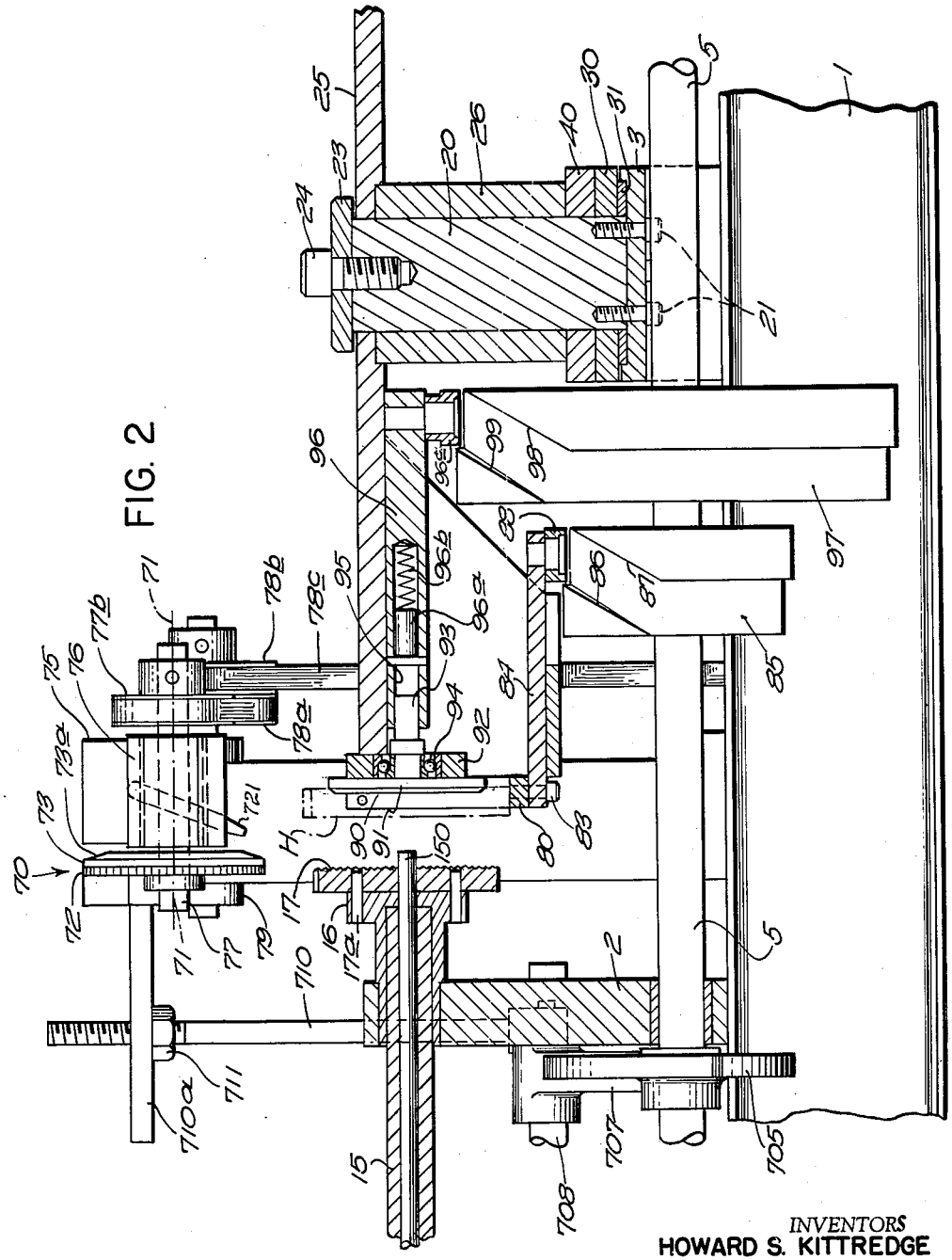

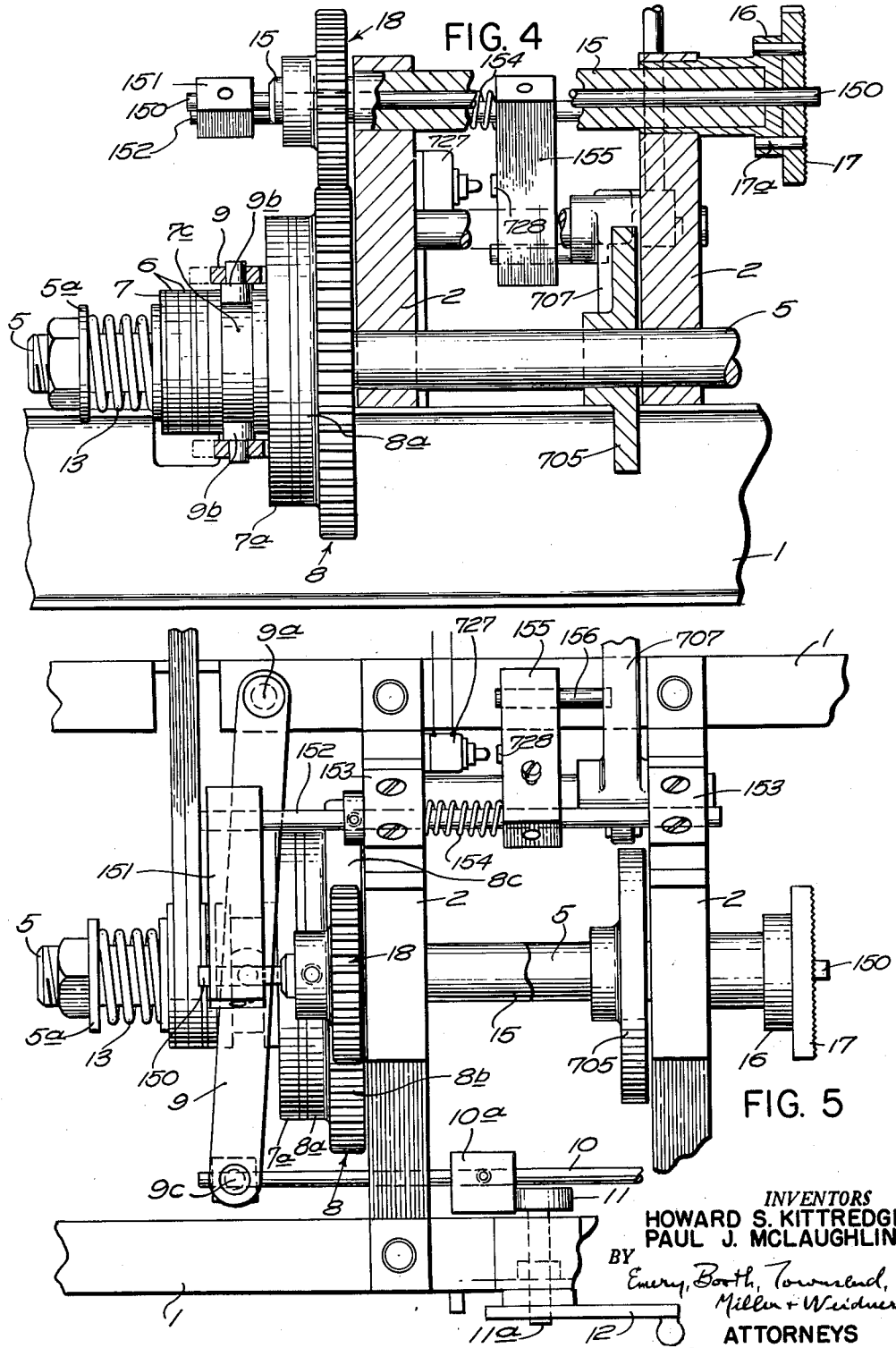

June 26, 1962    H. S. KITTREDGE ET AL    3,040,630
MACHINE AND METHOD FOR REMOVING RIND FROM MOLDED OBJECTS
Filed Nov. 27, 1957      6 Sheets-Sheet 5
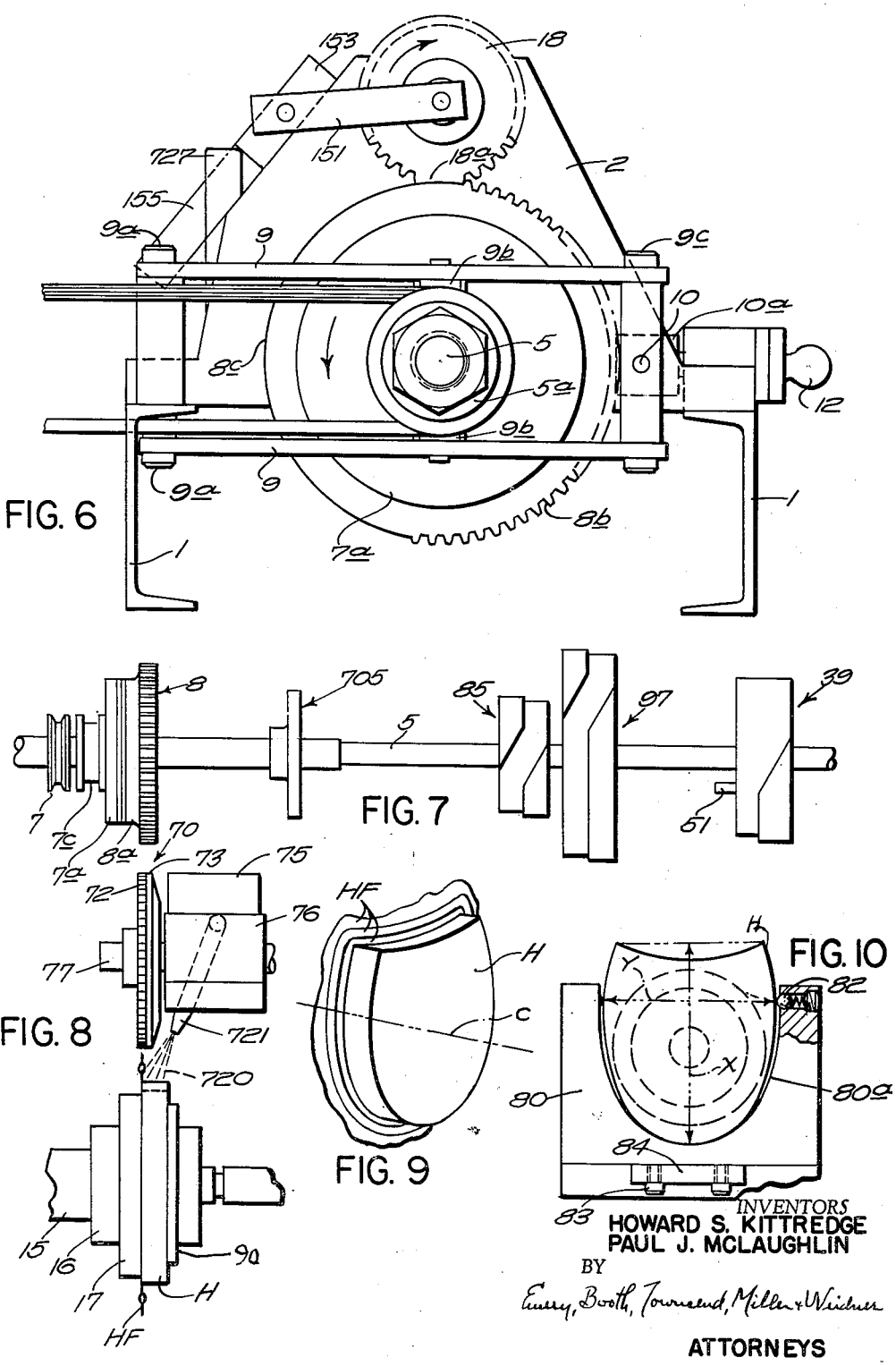
INVENTORS
HOWARD S. KITTREDGE
PAUL J. MCLAUGHLIN
BY
Emery, Booth, Townsend, Miller & Weidner
ATTORNEYS

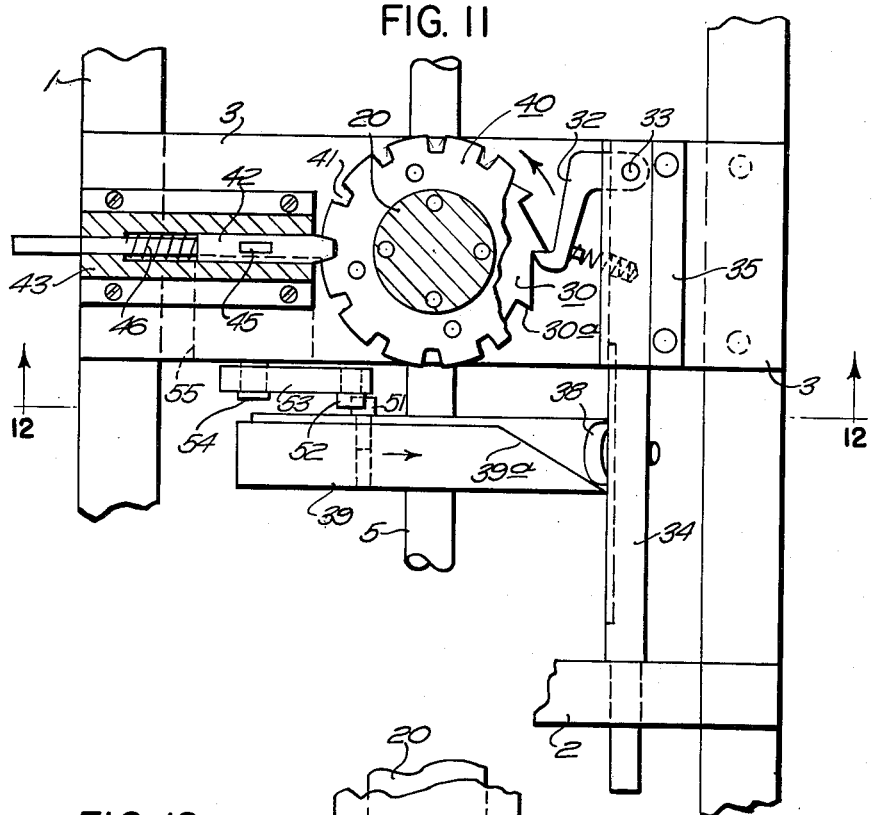
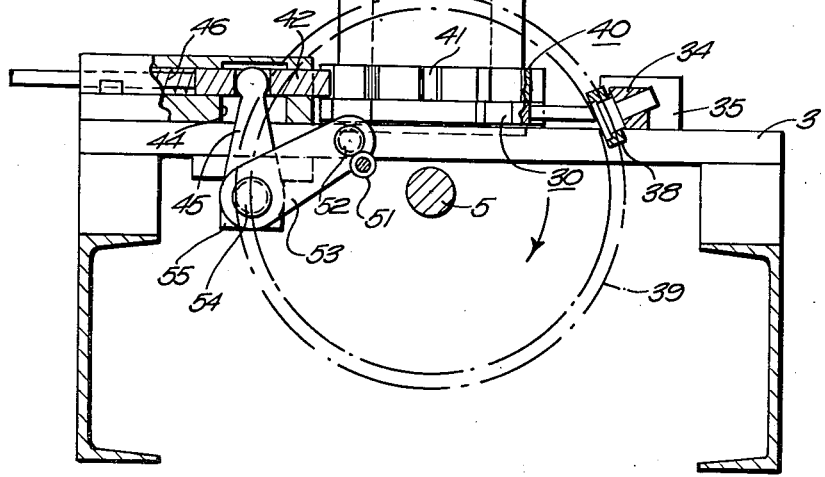

United States Patent Office 3,040,630
Patented June 26, 1962

3,040,630
MACHINE AND METHOD FOR REMOVING RIND FROM MOLDED OBJECTS
Howard S. Kittredge, 197 Lincoln St., Newton, Mass., and Paul J. McLaughlin, 101 Prospect Hill Road, Waltham, Mass.
Filed Nov. 27, 1957, Ser. No. 699,405
12 Claims. (Cl. 90—11)

This invention relates to the severance and removal of projecting excess material such as occurs on molded articles by escape at the parting lines of the molds. Such excess, in the form of a more or less continuous ring or fin, of various thicknesses, widths and flexibility, and often quite irregular, according to the material and mold, is known as the fin, flash, rind or spew. The term "flash" is herein used as probably that most commonly met in the rubber and plastics molding art. The invention aims to provide for automatically trimming this flash from molded blanks, articles or work pieces of various sizes and shapes.

The invention as to apparatus and method is particularly adapted for rapid automatic flash removal from items such as soles and heels for footwear, especially molded rubberous and composition heels. This is a job not heretofore satisfactorily accomplished other than as a laborious and hazardous manual procedure by skilled operators. Under our present invention it is no longer necessary to hold in the hand and maneuver each individual heel while subjecting it to removal of the flash. Instead, the entire operation of individually presenting and trimming the heels or other flash-carrying molded objects is effected automatically, in a continuous repeat-cycling process.

Because of this important application of the invention to the removal of flash from molded rubber and composition heels, the work piece or article is shown in the accompanying drawings as a heel H. For convenience in the further description the term "heel" will generally be used, but will be understood as including the various forms of molded articles for which the invention is useful.

In the accompanying drawings illustrating one embodiment of means of the invention and for practice of the method thereof:

FIG. 1 is a top plan view of the machine as a whole;

FIG. 2 is a central vertical longitudinal section at the trimming station, on a larger scale;

FIG. 3 is a transverse elevational view of the cutter assembly, looking lengthwise of the machine from the right in FIGS. 1 and 2;

FIG. 3A, corresponding to a portion of FIG. 3, shows the cutter and a heel in the course of a cutting cycle;

FIG. 4 is a vertical longitudinal section at the drive end of the machine, the left in FIG. 1, with certain parts in elevation;

FIG. 5 is a top plan generally corresponding to FIG. 4;

FIG. 6 is an end elevation at the drive end, as viewed from the left in FIGS. 1, 4 and 5;

FIG. 7 is a partly diagrammatic view of the main drive or cam shaft and parts thereon;

FIG. 8 is a detailed view in front elevation of the cutter and associated parts at the trimming station as at the approach to a flash trimming operation, with flash-carrying heel in position at said station;

FIG. 9 shows separately a characteristic work-piece or heel blank, prior to automatic flash removal;

FIG. 10 is a detail view of a heel receiver or locator as viewed from the left in FIG. 2 illustrating the body of a heel located thereon as during presentation, as though seen in a plane behind that of the flash, noting the adjacent FIG. 9, the flash being omitted merely for clearer showing of the locator parts;

FIG. 11 is a horizontal sectional view of work indexing and locking means of the heel presenting assembly, adjacent the right end portions of FIGS. 1 and 2; and FIG. 12 is a vertical section as on the line 12—12 of FIG. 11 with the indexing and lock controlling cam in phantom.

Under the invention the flash is removed by acting upon it with a high-speed toothed rotary instrument or cutter operating in a plane coinciding generally with the plane of the flash. This cutter, designated as a whole at 70, FIGS. 1, 2, 3, 3A and 8, comprises a wheel or disc in the nature of a milling cutter 72 with a circumferential series of transverse chisel-like teeth as at 72a, having the cutting edges generally parallel to the cutter axis, adapting them to span or straddle the flash. For cooperation with this cutter the work such as a heel is supported to turn on an axis normal to the plane of the flash. Thus the cutter axis and the work-supporting axis are generally parallel to each other; and the plane of the flash lies in or closely parallel to the operating plane of the cutter 70.

The work-supporting axis, transverse to the flash plane, is located within and geometrically central of the area circumscribed by the flash. During the cutting action the supported work turns on that axis through such angle up to 360° that the entire circumferential extent of the flash comes opposite and is acted on by the cutter.

Further under the invention, the cutter and the work are given capacity for relative approach and retreat, with their axes in self-parallelism, as by enabling the cutter to move to and from the work in floating relation to it and to follow the work contour at the base of the flash in a positively guided and gaged coaction with the work.

These general principles of the invention as embodied in the cutter and associated structure, arrangement and resultant manner of flash removal are a departure from prior practices such as that of hand-processing shoe heels by means of thin-edged rotary knives in a plane angular to that of the flash. As applied to the particular work pieces herein illustrating the invention, namely, shoe heels, they are readily apparent by reference particularly to FIGS. 1 to 3A, 8, 9 and 10.

A typical rubber heel or blank H is there shown in the condition as it comes from the mold, with a fin of flash HF projecting more or less irregularly at the side face of the heel. Customarily, with a mold having one parting line, the single flash is adjacent the bottom or tread face of the heel as indicated.

The axis of rotary support for the heel H is indicated at $c$, FIG. 9, at the geometric center of the finished heel, centrally within the area surrounded by the flash HF, this being the area defined by the top and bottom faces of the heel. This supporting heel axis $c$ is normal to the plane in which the flash HF projects. It is located at a point as plotted by coordinates $\frac{1}{2}x:\frac{1}{2}y$, FIG. 10, where $x$ is one maximum dimension, as lengthwise or fore-and-aft of the heel, and $y$ is the maximum dimension at right angles thereto.

The cutter wheel unit 70 has its axis 71, FIG. 2, central of the circumferential toothed cutter proper 72 and the transverse or cutting edges of the teeth parallel said cutter axis 71. Also the heel axis $c$ and said cutter axis 71 are parallel with each other. Further, the operating plane of the cutter proper 72 coincides with the plane of the flash HF, FIGS. 3, 3A, 8 and 9; both herein being substantially vertical, with the teeth of cutter 72 transverse to the plane of the flash HF, so as to span or straddle the flash.

The cutter unit 70 is bodily movable, herein vertically, toward and from the heel, with the axes $c$ and 71 kept parallel. The extent of this relative bodily movement is adequate under maximum separation to let a flash-carrying heel assume position below the cutter, and thereafter to permit the cutter unit to approach and float on the heel and to follow the lateral contour thereof during a synchronized period of controlled turning of the heel about the supporting axis c.

The toothed cutter 72 is driven at cutting speed and is positively gaged and guided in the cutting or trimming operation by a rotary cylindrical gauge 73 comprised in the cutter unit and rotatively mounted coaxially with said toothed cutter element 72. This gauge 73 is relatively narrow, in the axial direction, as compared with the thickness of the heel. It is adapted to contact and seat on the narrow face of the heel adjacent the plane of the flash, and has a diameter the same as or slightly greater than the toothed cutter proper 72. Thus the approach of the cutter 72 to the margin of the heel is definitely limited by the gauge 73. The cutter accordingly cannot remove material below the base of the flash, while the latter is removed entirely to but not below the transverse surface of the heel upon which the gauge rides.

It will be apparent from the subsequent more detailed description that by reason of a floating mount for the cutter unit 70 the latter is enabled to move toward and from the axis of the heel not only in initial approach thereto at the start of a cutting operation and in retreat therefrom on completion of the cutting, but also during the cutting. Thus the cutter is enabled to follow a non-round contour of the work, as in the case of a heel H, as the latter is turned in engagement with the cutter gauge 73. Portions of the rotatably supported work having greater radial extent, such as the points of a heel at either end of the heel breast, pass readily beneath and in trim-receiving coaction with the cutter 72, the cutter unit 70 as a whole rising and falling as appropriate to the heel or work contour and as positively guided and controlled by the rotary gauge 73. It will be understood that the cutter radius is determined for any particular work so as to be not greater than the radius of any re-entrant portion, such as the concavity at the heel breast. For special cases such as "wedgee" heels having a slanted breast portion the cutter unit may have a further rotary gauge member of beveled or conical form as at 73a presenting a guide surface at an inclination corresponding to that of the special heel mentioned; see FIGS. 2, 3, 3A, 8 and 9.

The invention comprises in coordination with the rotative support for the work and with the cutter means acting upon the work while so supported, correlated mechanism whereby the work pieces or heels H are individually presented in succession at the flash-removing or trimming station and are there located and accurately held in the described relation to the cutter means and in appropriate angular relation to the rotary support so as to be turned with and by it during the flash trimming operation covering the entire circumferential extent of the flash; FIGS. 1, 2, 11 and 12.

Now referring to the drawings in more detail, the apparatus shown by way of example, arranged for bench installation, has a bed or frame including longitudinal rails 1, 1 and frame-defining cross members such as uprights 2, 2, etc., and a cross-plate 3, FIGS. 1 to 3. Such cross members provide bearing support for a main actuating and control shaft 5, herein generally called the cam shaft, extending substantially the length of the machine between and paralleling the rails 1, 1.

The cam shaft 5 is driven from any suitable power source such as the motor M on or associated with the machine frame and connected to drive the input end of a reduction unit 4. The output end of the latter is connected as by twin V-belts 6 to a double pulley 7 loose and slidable on the cam shaft 5 along with one part 7a of a clutch unit of known positive abutment type. The other interengageable clutch part 8a is fast on the cam shaft 5 along with an interrupted gear 8 which intermittently drives to work-supporting spindle 15 to be described.

For engaging or releasing the cam shaft drive at the will of the operator any suitable means is provided. For this purpose we have shown a shipper yoke 9 straddling the shaft, with a fixed pivot at one end on the machine frame as at 9a and carrying rolls 9b received in a circumferentially grooved collar portion 7c of the pulley section 7a of the clutch unit. A shift rod 10 slidable in the adjacent uprights 2 is pivotally connected as at 9c to the other end of the shipper yoke 9 and carries an adjustable abutment block 10a engageable by an eccentric cam 11 on a stud 11a journaled in the frame, as on the front rail 1. A cranked handle 12 on the stud, with appropriately located stops for the on and off positions is disposed conveniently to the operator. The clutch parts are spring-loaded toward engaging position as by a coil spring 13 on the cam shaft 5 outwardly of the pulley 7 and thrusting between it and a stop collar 5a on the shaft. By throwing the handle 12 a half-turn in one or the opposite direction the operator can stop the machine at any point in a cycle and re-start it as desired.

At a level above the cam shaft 5 the intermediate pair of uprights 2, 2 rotatively mount the work-supporting and turning shaft or spindle 15. The fixed axis of this spindle 15 provides the work-supporting axis previously mentioned in the general description and defines a center of rotation for the successive heels H during the flash trimming operation.

Noting FIGS. 1, 2 and 4 to 6, the spindle 15 has fast at the inner or work end a nose 16 to which an interchangeable face plate 17 is centrally secured as by pins 17a. This face plate 17 is of a size and shape to abut the central area of that face of a heel H which is adjacent the plane of the flash HF, this usually being the tread face of the heel. The exposed heel-receiving surface of the face plate 17 may be knurled or roughened and appropriately recessed or embossed to accommodate any particular design formations at the tread face of the heel, being thus adapted for firm non-slip engagement with the heel. In any instance the selected face plate 17 is of somewhat less radial extent than the heel to be received against it. Thus the face plate 17 is slightly spaced inward from the peripheral margin of the heel at all points around it. At the same time the particular face plate 17 is accorded appropriate shape and adequate area to afford a firm backing to the more or less flexible and resilient heels to be trimmed.

The spindle 15 with associated parts described locates and defines the flash-removal or trimming station. Here each heel H carrying flash HF to be removed is individually presented to and against the spindle face plate 17, in determined angular relation and so as to be turned with and by the spindle 15. The presenting and holding of the heels H at this trimming station is accomplished by the cooperation of locator and ram holder means of the intermittent heel feeding sub-assembly to be described.

The machine as a whole is herein so organized that one revolution of the cam shaft 5 represents one operating cycle. During each such cycle a heel H is fed to and located at the trimming station and there is rotated during removal of the flash HF by the cutter unit 70. For the first part of the cycle the spindle 15 stands at rest, while the cam shaft 5 effects the turret unlocking, indexing and heel-presenting operations to be described. During the ensuing trimming portion of the cycle the spindle 15 with a heel H makes one full revolution, starting from a selected angular position, preferably that in which the heel breast is uppermost and central as in FIG. 3 and halting accurately in the same position.

The described cycling is provided by suitable drive connections between the cam shaft 5 and the spindle 15. As shown in FIGS. 4 and 5 the spindle drive comprises a pair of 1:2 interrupted gears. The larger of these is the gear 8 on the cam shaft previously mentioned in connection with the clutch unit. The toothed portion 8b thereof and the non-toothed portion 8c each occupy approximately 180°. The other and smaller gear 18 of the pair is fast on the spindle 15. It is formed with a brief interrupted or non-toothed dwell portion 18a; see FIG. 6. The meshing toothed portions of this interrupted gear pair 8, 18 are proportioned and arranged so that the approximate half-revolution of the cam shaft 5 during which the gears are engaged causes one complete turn of the spindle 15. During the preceding half-turn of the cam shaft the non-toothed half-portion of the gear 8, having the radius of the pitch circle thereof, moves non-drivingly past the spindle gear 18 at the relatively short blank portion thereof. The latter is formed on an arc closely conformant to the pitch circle of the gear 8. Hence during the idling period the spindle gear 18 is in effect locked and positively held in the desired rest position aligning the face plate 17 for reception of a heel H to be trimmed.

The successive heels are brought to and located at the described trimming station by intermittent feed mechanism and associated heel-locating and holding means now to be described. As particularly suited to this purpose we have illustrated a rotary loading table or turret 25, FIGS. 1 and 2, with certain operating features further detailed in FIGS. 11 and 12.

Such turret 25 is adapted to receive a succession of the individual heels, at any convenient loading point about it, and to index them around to and present them at the trimming station at the spindle 15. It is equipped with a circumferential series of heel receiving and presenting means to be described. These serve to receive, feed and present the heels individually in accurate location opposite and against the face plate 17 of the spindle 15 so as to be turned in the vertical plane during the trimming operation, with the turret then at rest. Following the removal of the flash by the high-speed toothed rotary cutter device 70 the trimmed heel is released to a collecting chute or conveyor 100, FIG. 3, and the next heel is presented in the trimming station.

The turret assembly is mounted on the machine bed, as on the cross plate 3 previously mentioned. A turret centering vertical stud 20 is fixed centrally on said mounting plate 3, as by screw bolts 21, FIG. 2. The fixed stud 20 provides a center bearing for the table proper or top plate of turret 25, having a central aperture for the stud 20. Centrally fixed to the underface of the turret table is a vertical sleeve 26, the lower end of which is received on and secured to a turning and locking unit comprising a circular indexing rack 30 and a locking plate 40 with underlying thrust bearing means on the mounting plate as at 31. The turret as a whole is removably held on the center stud 20 by an overlying top washer 23 secured by a cap bolt 24 tapped into said stud.

The turret is indexed step by step through the medium of the circular rack 30, see FIGS. 11 and 12. For acting on the rack a pawl 32 is pivoted as at 33 on a reciprocable carrier bar 34 slidably guided at one end in a guide 35 on the mounting plate 3 and at the other end in the adjacent cross member 2. A coil spring 32a on the bar 34 urges the hook end of the pawl into peripheral engagement with the rack 30. At an intermediate point the pawl carrier bar 34 has transversely journaled on it a cam roll 38 for coaction with the turret indexing cam 39 on the cam shaft 5; see also FIGS. 1 and 2.

As apparent in FIGS. 11 and 12 rotation of the cam shaft 5 in the direction of the arrow, clockwise as viewed in FIG. 12, will upon engagement of the cam surface 39a with the roll 38 shift the carrier bar and pawl lengthwise of the machine, toward the top of the sheet viewing FIG. 11. Attendant engagement of the pawl 32 with the adjacent tooth of the rack 30 steps the latter and the turret assembly one unit of angular rotation, counter-clockwise in FIG. 11.

The turret has distributed around it a series of receivers for the individual blanks or heels H. Each receiver comprises a cup-like block or locator 80 and within the cavity thereof a clamping holder or ram 90 each adapted for correlated but separate advance and retreat radially of the turret to present and hold the heels at the trimming station. The number of such receivers 80, 90 may be variously selected as appropriate to the articles to be handled and the degree of turret rotation desired at each step. In the illustrated example the turret has twelve receivers 80, 90 equally spaced 30° around the turret periphery. The rack 30 conformantly has twelve similarly spaced indexing teeth 30a. The pawl 32 is actuated once for each revolution of the indexing cam 39 with the cam shaft 5. With each such indexing step, one for each operating cycle, a heel to be trimmed is brought opposite the then stationary spindle 15, following discharge of the heel trimmed in the preceding cycle.

To insure accurate presenting of the successive heels directly in axial line with the spindle 15 positive locking and releasing means for the turret is provided, as for example in FIGS. 11 and 12. The upper or locking plate 40 previously mentioned, see also FIG. 2, overlying the circular rack 30 and secured to the turret sleeve 26 along with the rack, is formed with a corresponding number of radial locking notches 41, herein twelve. Each notch is adapted to receive in turn the conformant adjacent end of a locking pin 42 slidable in a guide block 43 on the fixed cross-plate 3. The latter is formed with a slot 44, FIG. 4, for a finger 45 projecting up through a slot in the block 43 into a recess in the locking pin 42. A coil spring 46 surrounding a reduced portion of the locking pin within the guide block 43 urges the pin normally into turret-locking engagement with the locking plate 40.

For releasing the locking pin 42, in proper timed relation for indexing of the rack 30, the mentioned indexing cam 39 carries a laterally projecting cam pin 51, FIGS. 11, 12 and 7. In the path of the cam pin is a roll 52 on an arm 53 fixed on one end of a horizontal stud shaft 54 journaled in a hanger block 55 at the underface of the fixed cross-plate 3. The described locking-pin finger 45 is fixed on the other end of said stud shaft 54. At the proper time in each revolution of the cam shaft 5 the cam pin 51 is adapted to wipe and lift the arm 53 so as to turn the stud shaft 54 and the locking-pin finger 45 in the pin-retracting direction, toward the left in FIG. 12. This releases the turret locking plate 40 and permits the pawl 32 and rack 30 to index the turret one step. The release-actuating cam pin 51 has but momentary actuating engagement with the locking pin arm 53, quickly moving past the latter and readying the spring-loaded locking pin 42 for entry into positive holding engagement in the next arranging notch 41 of the locking plate 40. Thus on completion of each step the turret is accurately and positively positioned to present a heel at the flash-removing station.

Considering now the heel receiver means 80, 90 in more detail, reference is made to FIGS. 1 and 2, also FIGS. 8 to 10, 3 and 3A. These are radially slidably mounted in housing guide blocks 81 at the underface of the turret 25, one for each index step position. Each being identical, description of one such means will suffice.

Considering now any one of said heel receiver units or sub-assemblies, the heel locator 80 is disposed at the outer end of the corresponding housing block 81. It occupies an upright position at the periphery of the turret table 25. It is formed with a cup or pocket 80a open at the top and having the vertical sides and bottom generally conformed to the particular run of heels to be trimmed. The depth of the locator cup 80a is sufficient to accept a major portion of the length of the heel. To assist in retaining a heel in the locator cup during indexing of the turret and in centered position therein the upright cup walls may be provided with opposed spring-pressed detent buttons 82. The mouth of the cup 80a preferably is slightly wider than the given heel, for ease of entry and for ready engagement of the detents with the heel sides. This cupped locator 80 is demountably held on a cross-piece 83 at the outer end of a slide 84 supported and guided for movement radially of the turret in the lower part of the guide block 81. Locators 80 having different sizes of cups as appropriate to different heels are provided, the locators being removably held on the slide as by screw bolts 83.

For advancing and retracting the locator toward and from the spindle face-plate 17 the cam shaft 5 is provided with a cam 85 located with respect to the turret so as to be ready to actuate each locator slide 84 as the turret brings it opposite the trimming station. The cam 85 has a leader portion 86 and a return portion 87 adapted to coact at said time with a cam roll 88 at the underface of the slide 84. Thus at the proper time in each operating cycle as determined by the cam 85 the heel-loaded locator 80 which has been indexed into position at the trimming station is advanced radially outward from the turret and toward the spindle face-plate 17 to present thereto the heel H which it carries. Promptly thereafter and before the cutter 70 is brought into operation the locator 80 is oppositely withdrawn by the return portion 87 of the cam; see FIGS. 1, 2 and 7.

To retain the heel blank in the presented trimming position and with capacity to turn with the spindle plate 17 during the ensuing trimming operation, the clamping holder or ram 90 is employed. This comprises a ram proper or head 91 defining in effect a back wall for the cup of the corresponding locator 80. It is of a relative size to permit it and the locator to have movement relative to each other as well as toward and from the spindle. Its outer face conforms to that of the adjacent face of the heel blank, the face opposite the heel tread. At its portion nearer the axis of the turret 25 the ram 90 has a concentric collar 92 rotatably supported on a stud 93 preferably through an interposed ball bearing unit 94. The non-round inner end of the stud 93 has a sliding fit in a guide bore 95 of a slide 96 itself guided for sliding movement radial of the turret 25 in the upper portion of the guide block 81. A plunger 96a with loading spring 96b in the bore of the slide 96 and having a suitable stop limiting its outer movement urges the ram 90 radially outwardly while affording it the capacity to yield in adjustment with the presented heel H.

Appropriately timed operation of the ram 90 is effected by a further cam 97 fast on the cam shaft 5 in position to coact with the ram slide 96 as it is stepped into position at the trimming station. This ram-actuating cam 97 has a leader portion 98 and a return portion 99 for coaction with a cam roll 96c hung at the inner end of the ram slide 96; FIG. 2.

The ram cam 97 is timed relative to the locator cam 85 so that the ram 90 and the locator 80 of each heel-presenting unit first move toward the spindle face-plate 17 substantially in unison. Together they present the heel H accurately against the spindle face-plate. The locator 80 then immediately withdraws, while the ram remains in extended position oppositely adjacent the spindle face plate and in firm thrusting engagement with the heel, holding the latter in securely clamped centered position with respect to the spindle axis. This heel clamping thrust is in effect transmitted through the backer spring 96b of the ram slide 96, the loading of which is adjustable to regulate the pressure as appropriate to the desired firm holding of the work.

The ram 90 remains in the projected holding position during the following trimming portion of the cycle. By reason of the rotary mount 92—94 for the ram head 91 the latter and the supported heel H together with the spindle 15 and its face-plate 17 are enabled to turn as a unit about the axis of the driven spindle. Following one full revolution of the spindle during which the trimming of the flash is effected the ram 90 is retracted by the return portion 99 of the cam 97, into position to again form with the locator 80 a receiving pocket for another heel. Said retraction of the ram permits the trimmed heel to drop onto the chute or conveyor 100 for conducting it to any suitable receiving point; see FIG. 3.

It will be understood that the described actions of heel presentation and holding tre eprformed by each of the succession of locator and ram units distributed around the turret 25, as each such unit is stepped into place at the trimming station and thereby is brought into position to be picked up and acted on by the locator and ram cams 85 and 97 on the cam shaft 5. Thus a succeeding locator and ram unit carrying a heel H to be trimmed is presented for each operating cycle.

Earlier herein we have described the cutter or wheel unit 70, including the toothed cutter proper 72 and the rotary gauge 73—73a. The parallel relation of the cutter axis 71 and the axis c of the heel-supporting spindle 15 has been noted; also the rotary operation of the toothed cutter 72 is in the plane of the heel flash HF, with attendant mounting of the entire cutter unit 70 with capacity to approach and withdraw bodily to and from the heel, in the plane of the flash and of the cutter rotation, and to float on and follow the heel in trimming the flash from it under positive guidance and control by the gauge means 73, 73a.

Said cutter mounting comprises a pedestal 74 secured to the machine bed as on a bracket 74a projecting from the rear rail 1. Desirably the pedestal 74 is adjustable lengthwise the machine, for accurate aligning of the cutter with the heel flash, as by slot and bolt connection between the pedestal base and the supporting bracket 74a. The cutter unit 70 is disposed at one end of the cutter arm or support 75 as by means of a journal block 76 rotatably carrying the cutter arbor 77. The latter defines the cutter axis 71 previously mentioned; see FIG. 2 and particularly FIG. 3.

The cutter supporting arm 75 extends transversely of the machine bed, at a level to present the cutter unit 70 in the described relation to the heels to be trimmed. The other or rear portion of the cutter arm 75 has horizontal pivotal support on the pedestal 74 with capacity to be adjustably turned about its own axis as by a spanner wrench engageable with a wrench-receiving formation at one end face of the bushing 79.

On the arbor 78 is a pair of V-belt pulleys 78a, 78b one of them having drive connection as by the V-belt 78c with the shaft of a high-speed motor 700. The other pulley of the pair and which turns in unison with the motor-driven pulley transmits as through a V-belt 77a to a pulley 77b fast on the cutter arbor 77. It will be seen that by turning the eccentric bushing 79 the position of the arm-supporting arbor 78 and the pulleys thereon may be adjusted for belt tensioning purposes and for precision setting of the cutter arm along with the cutter unit 70 thereon.

The cutter arm 75 along with the cutter unit 70 is constructed and arranged to be substantially balanced about the horizontal supporting axis 78 therefor on the pedestal 74 by reason of the structure of the parts themselves and through the medium of a counterweight 701 slidably adjustably carried on a rod 702 extending rearwardly from the cutter arm 75 and releasably fixed on it as by a set screw 703. By appropriate setting of the counterweight 701 the cutter unit 70 is nicely balanced in effect to float on the peripheral face of the heel H at the trimming station, with the rotary gauge element 73, 73a following upon said face as the heel is turned and thereby maintaining the high-speed toothed cutter proper 72 in desired trimming relation to the flash HF at all points around the heel. In this manner the flash is rapidly trimmed flush to the heel with a completeness of removal comparable or superior to that heretofore available under manual procedure, leaving a scarcely discernible or non-existent flash line. The flash comes off generally in the form of a "sawdust" of fragments and small particles as mentioned later herein. Through the medium of the positive roll-follower or gauge element 73 the cutter unit is certainly limited as to possible depth of cut, whereby mistrims and "seconds" among the finished heel products are practically impossible.

Reference has been made to a high-speed action for the toothed cutter 72. In accordance with the invention the cutter motor 700 and drive connections to the cutter unit 70 are selected and arranged, taking into consideration the particular cutter diameter and number of teeth, to afford a milling cutter action at a speed such that the cutting operation is characterized by rapidly successive engagements of the flash by a cutter-tooth edge transversely spanning the flash and revolving substantially in the plane thereof while the heel is turned in said plane to present the entire circumferential extent of the flash, said engagements being at a rate to comminute and cut from the heel all successively encountered portions of the flash.

In general it is found that the efficiency of the flash trimming increases as the rate of tooth-edge engagements is increased, complete flash removal being attained despite deflection, deformation, resiliency of composition or other property of the molded rubberous flash heretofore militating against automatic trimming. Merely by way of example, highly satisfactory results have been had on various sizes and types of molded rubber and rubberous heels by employing a 36-tooth 3 in. cutter 72 with drive motor 700 rated at 3450 r.p.m. producing about 9800 r.p.m. at the cutter arbor 77 to make spanning tooth-edge engagement with the flash available at a speed of about 5880 per second. Commercially satisfactory results however have been had at lower speeds including small fractions of that of the particular example and as low as under a hundred tooth engagements per second. At different speeds the consistency of the removed flash or "sawdust" varies from small pieces and chips through granular fragments and particles to a fine powder comparable to that of carbon black, all within the range of the high-speed milling cutter action under the method of the invention.

The active cutting portion of each operating cycle is accurately timed in the cycle, herein through means whereby the cutter unit 70 is bodily moved to, maintained in and retreated from trimming relation to the presented heel H. Noting FIGS. 2 to 5, such means is herein exemplified by the cutter control cam 705 on the cam shaft 5 and coacting with a follower roll 706 on one arm of a bell crank 707 rockable on a longitudinal stud shaft 708 on adjacent frame cross-members 2. The other arm of the bell crank 707 is pivoted as at 709 to the lower end of a post 710 extending up to the cutter arm 75 at a point in front of the arm supporting pivot 78 thereof. The cutter arm 75 may be precisely adjusted relative to the cam for appropriate control and timing purposes, the upper portion of the post 710 accordingly being extended through a bracket 710a on the arm 75 and having a threaded portion receiving below the bracket an adjusting nut 711.

As best seen in FIG. 3, noting also FIGS. 2 and 4, the cutter control cam 705 has a high 705a corresponding to the non-cutting portion of each operating cycle and a low 705b representing the active cutting period. In the full-line position of FIG. 3 the cam roll 706 is shown opposite the low 705b, with the bell crank 707 swung clockwise under the load of the connected cutter arm 75. The cutter unit 70 accordingly has moved bodily into trimming relation with the flash HF of the supported heel H. In FIG. 3 it is represented approximately at the start of a trimming action, as at the breast of the heel H.

While the cam low 705b moves past the roll 706, during the ensuing approximate half-turn of the cam 705 the spindle 15 and heel H thereat make one full turn, completely removing the flash HF. Then the cam high 705a comes opposite the roll 706 and rocks the bell crank 707 reversely, to the right in FIG. 3, elevating the cutter arm 75 and taking the cutter unit 70 up to the inactive position as indicated by the dotted lines, FIG. 3. It so remains during the succeeding approximate half-revolution of the cam shaft 5 during which the trimmed heel H is dropped to the chute 100 and the turret indexing and heel-presenting operations for the next work cycle are performed as previously described.

Desirably safety means is provided to prevent approach of the cutter 70 to the spindle 15 in the absence of a heel blank thereat, as for example in case an unloaded heel locator and ram unit reaches the trimming station. During an operative run of the machine untrimmed flash-carrying heels or blanks are entered into those locator and ram units which have recently indexed to and through the trimming station and have deposited their finished trimmed heels. Such loading of the blanks into the emptied locator units as they continue the circuit back to the trimming station may be variously accomplished, as by an operator at any convenient point about the turret, generally at the front of the machine, at the lower portion of the plan view of FIG. 1, at the left in FIG. 3. At whatever preferred loading station the operator readily supplies fresh heel blanks into the proximate receiving locator units, during the dwell periods of the turret or otherwise.

Should for any reason a non-loaded receiver unit reach the trimming station a safety means as above mentioned prevents any such approach of the cutter unit 70 to the bare spindle face-plate 17 as might result in damage to the toothed cutter 72. Appropriate means for this purpose is best seen in FIGS. 4 and 5. The spindle 15 is provided with an axial bore extending entirely through it and slidably carrying a push rod 150 adapted to project at the heel-receiving face of the spindle face-plate 17. At the outer or left end this push rod 150 also extends beyond the adjacent end of spindle 15 and is adjustably connected to a transverse strap 151 extending toward the rear of the machine and fixed to the adjacent end of another slide rod 152 longitudinally movable in guides 153, 153 on the pair of cross-members 2, 2 which support the spindle 15. The two slidable rods 150, 152 together with the strap 151 form a U-shaped slide unit, as viewed in plan in FIG. 5. This slide unit is urged toward the right in FIG. 5, into position to project the inner end of the push rod 150 at the face-plate as there shown, as by a coil spring 154 surrounding the rod 152 and thrusting between the adjacent cross-member 2 and a downwardly projecting finger 155 fixed on said rod.

At the lower end of said finger 155 is a horizontal pin or detent 156 of a length to underlie the rear arm of bell crank 707 when the slide unit 150, 151, 152 occupies the position as in FIGS. 4 and 5 with the push rod 152 of said unit projecting at the spindle face-plate 17, no heel being present thereat. At such time the pin 156 locks the bell crank 707 and holds the cutter arm 75 against descending from the inactive dotted-line position of FIG. 3. But on arrival of a heel blank at the spindle face-plate 17 under the thrusting action of any one of the locator and ram units the leading face of the heel, herein the tread face, abuts and thrusts the push rod 150 to the left, FIGS. 4 and 5, against the loading of the spring 154. Accordingly the rod 152, finger 155 and safety detent pin 156 are shifted in the same direction, retracting said detent from beneath the bell crank 707. Thus the proper placement of a heel blank at the spindle automatically releases the cutter arm 75 for performance of a trimming operation by the cutter unit 70.

With some blanks the flash is of a thinness or flexibility such that it is uncertainly self-supporting in its plane of projection and tends to lie over or droop to one or the opposite side from that plane. In the direction toward the spindle face-plate 17 such deflection is immaterial in the illustrated machine because it is away from the rotary cutter guide 73 and offers no possible interference to the trimming guide action of the latter and the toothed cutter is free to trim smoothly down to the juncture line of the flash at the heel. But excessive deflection of the flash in the opposite direction, toward the rotary guide 73, i.e. to the right in FIGS. 4 and 5, may occasionally bring some portion of the flash beneath the guide 73. While in general in such cases the flash is satisfactorily removed, minor irregularities might occasionally occur.

As insurance against any such irregular remnant of flash on the trimmed heel as to need re-trimming or as might cause rejection of a heel as a "second," means desirably is provided for definite clearance of any flash from beneath the cutter guide 73. Such means as herein shown comprises a compressed air jet 720 directed by a nozzle 721, FIGS. 2, 3 and 8 to impinge on the flash at the side thereof adjacent the guide 73 just before the start of and during the trimming operation. The nozzle 721 in the illustrated example is located at the underface of the cutter arm 75. It is supplied through a flexible conduit 722 leading rearwardly along the cutter arm 75 and thence to the outlet side of a spring-closed solenoid-opened air valve 724, on a fixed part of the machine. The inlet side of said valve is supplied with compressed air, for example at 50 to 60 lbs. pressure or upwards, from any suitable source.

For releasing the jet at the stated time a normally open microswitch 727 is located in position to be operated automatically in the course of each trimming cycle; FIGS. 4 and 5. In the present example this is accomplished by means of a switch-actuator 728 on the finger 155 opposite the actuator button of the microswitch 727. Thus opening of the valve 724 and emission of the air jet 720 is effected as the cutter arm 75 is readied for moving down toward a presented heel, the closing of the microswitch and opening of the air valve being attendant on shift of the heel-actuated slide unit 150—152 to the left in FIGS. 4 and 5, by the placement of a heel at the trimming station. Hence during the down movement of the cutter arm toward the heel, the air jet 720 is turned on. Conversely it is shut off under the return of said slide unit to the push-rod-projecting position of FIGS. 4 and 5, following depositing release of the trimmed heel from the spindle face-plate 17.

Our invention as herein described in connection with the drawings illustrating one example of apparatus for the practice thereof is applicable to the removal of rind, flash, spew and the like from round and non-round molded articles other than shoe heels here shown as an important usage, and will be understood both as to means and method as not limited to the exemplary embodiment or steps herein illustrated and described, and we set forth its scope in our following claims.

We claim:
1. In a flash trimming machine for molded rubberous blanks with finlike radially projective flash, means to support and turn a molded flash-carrying blank about an axis generally central of the flash and perpendicular to the plane thereof, driven intermittently presented rotary cutter means with peripheral teeth having transverse cutting edges spanning the flash of the supported blank, and means to erect the flash in the rotary plane of the cutter wherein the erecting means is pneumatic and is timed on and off with the presenting of the rotary cutter means.

2. In a flash trimming machine, a spindle with face-plate thereon defining a supporting axis of rotation for a molded blank to be trimmed, and blank presenting means comprising a pocketed locator member and a holding ram member, said members being moveable toward and from the spindle face-plate and also relatively to each other, means to advance said members together and then to retract the locator member while the ram member remains advanced in blank-holding relation to the spindle, and said ram member being rotatable coaxially in unison with the spindle while in blank-holding relation thereto.

3. A machine for removing mold-parting-line flash from molded articles such as heels in the manufacture thereof, comprising a rotary spindle, means to receive in serial succession and to present the molded articles individually opposite the rotary spindle with the flash plane perpendicular to the spindle axis, automatic means to engage each article successively against the spindle for one full revolution therewith, and a floating multi-transverse-edged rotary cutter automatically bodily moved operatively through the radial extent of the flash and into the flash root of each article while at the spindle, and means to rotate the cutter at speeds to remove the flash by comminution thereof, together with a rotary gauge coaxial with the rotary cutter to guide directly upon the article adjacent the root of the flash, flash erecting means adjacent the gauge, and means rendering said erecting means operative in advance of cutter and gauge approach to the article.

4. A flash trimming machine for molded rubberous blanks with finlike radially extensive non-self-supporting flash, said machine having, in combination, a rotary spindle adapted for centrally receiving a flash-carrying work blank with the plane of the finlike flash radial to the spindle axis, feeder mechanism intermittently to present successive blanks to the spindle, means automatically to seat and hold each presented blank on and to turn with the spindle, intermittent drive means for the spindle, a toothed rotary cutter floatively presented to be progressively operative on the flash in the plane thereof during rotation of the spindle and blank, and rotary means coaxial with the cutter and adapted to follow directly on the blank to delimit the cutter action.

5. A flash trimming machine for molded rubberous blanks with finlike radially projective flash, said machine having in combination, a rotary spindle to receive a flash-carrying blank with the flash radially extending, an intermittent feed device with a series of receivers for a plurality of the blanks to be presented successively to the spindle, reciprocating means for each receiver to seat and rotatably hold each blank at the spindle and with the blank margin exposed, a floating driven multi-transverse-edged rotary trimmer wheel adapted to span and trim off the flash from the spindle presented blank, means for effecting approach and retraction of the trimmer wheel to and from said blank, intermittent spindle drive means to turn the blank through the entire peripheral extent of the flash during trimming relation of the trimmer wheel thereto and thereafter to halt and release the trimmed blank, in successive automatic cycles, means to feel for the presence of a blank at the spindle, and means to prevent trimmer wheel approach to the spindle in the absence of a blank thereat.

6. In a flask trimming machine for molded rubberous blanks with finlike radially projective flash, means to support and turn a molded flash-carrying blank about an axis generally central of the flash and perpendicular to the plane thereof, driven intermittently presented rotary cutter means with peripheral teeth having transverse cutting edges spanning the flash of the supported blank, high-speed drive means for the cutter means cooperating with the drive means to erect the flash in the rotary plane of the cutter means, and a delimiting guide for the cutter means adapted to follow directly upon the blank, said rotary cutter means having a supporting shaft paralleling and bodily moveable to and from the blank axis and the radius of the teeth from the shaft axis being less than the radius of any reentrant concavity at the blank circumference.

7. In a flash trimming machine for molded rubberous blanks with finlike radially projective flash, means to support and turn a molded flash-carrying blank about an axis generally central of the flash and perpendicular to the plane thereof, rotary cutter means with peripheral teeth presenting transverse cutting edges spanning the flash of the supported blank, flash erecting means, and mechanism mounting the cutter means for bodily movement to and from the supported blank in a cutting cycle and so as in effect to float in gravitational counterbalance relative to the blank while cutting the flash therefrom, and a rotary gauge coaxial and cooperating with the cutter means and blank so as to track on the latter for controlling said floating of the cutter means and to determine the depth of flash removal.

8. A flash trimming machine having, in combination, means rotatably to receive and hold a flash-carrying heel blank at a trimming station, and including blanks for heels having a reentrant marginal portion, a bodily movable driven rotary cutter to act transversely upon the flash in the plane thereof, feed means to index successive blanks to the rotatable receiving and holding means, means to effect presenting and retracting movement of the cutter in axial self-parallelism into and from the trimming station, and cycling drive and control means for the blank receiving and holding means, the feed means and the cutter whereby the feed means and the cutter are active alternately and in automatically recurring cycles, said cutter having an operative cutting radius less than the radius of any reentrant marginal portion of the heel blanks.

9. The process for finishing rubberous molded articles such as heels carrying circumferentially radially projecting mold-parting-line flash and wherein the flash of individual articles may vary irregularly not only in radial extent and in contour but also in thickness dimension and flexibility from near self-supporting semi-rigidity to non-self-supporting substantial limpness, which comprises supporting the flash-carrying rubberous molded article for turning in the plane of the basal juncture of the flash about an axis perpendicular to said plane and geometrically central of and within the area circumscribed by the flash, turning the article upon said axis, rotating at high speed a multitransverse-edged cutter about an axis paralleling and shiftable to and from that of the article with the cutter in a plane such that the cutter edges straddle the plane of the flash, causing at least a substantially projecting area of the basal portion of the flash and including non-self-supporting parts thereof to stand radially erect toward the cutter edges, floatingly approaching the rotating cutter into rotary cutting engagement with the flash and continuing the approach and the cutter rotation at such multiplicity of edge engagements per second as to comminute and remove the flash, and guiding and limiting the cutter action for flash removal to be flush with the flash juncture at the article by non-marring guidance of the cutter by engagement of a movable rotary portion thereof directly upon the circumference of the article adjacent the flash.

10. A flash trimming machine for molded rubberous blanks with flexible finlike radially projective flash including irregular and non-self-supporting flash, said machine having a combination, a rotary spindle to support a flash-carrying molded rubberous blank for rotation about the spindle axis and in the plane of the radially projective flash, feeder means for intermittently presenting successive blanks to the spindle, a rotary cutter with axis paralleling the spindle axis and having peripheral teeth with cutting edges adapted to span the flash, vertically movable support means and gravitational counterbalancing mechanism therefor normally to hold the cutter radially beyond the projective extent of the flash and movable to cause the cutter to approach and to float upon the flash-carrying margin of a supported blank and in spanning trimming relation to the flash, means to rotate the blank during said trimming relation of the cutter thereto, drive means to rotate the cutter at such multiplicity of tooth engagements per second as to pass through and remove the flexible finlike flash flush with the blank margin, and a rotary gauge coaxial with the cutter and adapted to track directly on the blank itself positively to limit the depth of cutter action to the juncture of the flash and blank.

11. In a flash trimming machine for molded rubberous blanks with finlike radially projective flash, a frame, a rotary spindle thereon rotatably to support a blank for turning about the spindle axis in the plane of its flash, intermittent feed means for supplying individual blanks to the spindle, a high-speed toothed rotary cutter member on an axis paralleling the spindle axis and spanning the flash plane in trimming relation to the flash of the blank turning therein, drive means for rotating the cutter at speeds in excess of 5000 r.p.m. and 100 tooth presentations per second, a floating mount including gravitational counterbalancing means for the cutter member permitting it to approach by gravity and to follow the circumference of the turning blank in flash-trimming relation thereto and including concave circumferential portions as at a heel breast, said cutter having a radius less than the radius of any such concavity of the blank, and a rotary gauge coaxial with the cutter member for tracking directly on the blank adjacent the juncture of the flash with the blanks thereby positively to restrict the trimming action solely to the flash.

12. A machine for removing mold-parting-line flash from molded articles such as heels in the manufacture thereof, comprising a rotary spindle, means to receive in serial succession and to present the molded articles individually opposite the rotary spindle with the flash plane perpendicular to the spindle axis, automatic means to engage each article successively against the spindle for one full revolution therewith and thereupon to release the article, and a gravitationally counterbalanced floating multi-transverse-edged rotary cutter automatically bodily moved operatively through the radial extent of the flash and into the flash root of each article while at the spindle, means so to bodily move the cutter, means to rotate the cutter at speeds in the order of 100 tooth presentations per second and upwards thereby to remove the flash by comminution thereof, and feeler and control means operated by proper engagement of each article against the spindle to prevent movement of the cutter to operative position in the absence of an article at the spindle.

References Cited in the file of this patent
UNITED STATES PATENTS

| | | |
|---|---|---|
| 1,855,793 | Dorner | Apr. 26, 1932 |
| 2,010,654 | Sheehan | Dec. 7, 1937 |
| 2,620,873 | Eaton | Dec. 9, 1952 |
| 2,720,668 | Liberty | Oct. 18, 1955 |
| 2,751,613 | Lassy | June 26, 1956 |
| 2,861,503 | Lattner et al. | Mar. 25, 1958 |
| 2,877,676 | Swanson et al. | Mar. 17, 1959 |
| 2,942,527 | Bowen | June 26, 1960 |